US012635616B1

(12) United States Patent
Hancock

(10) Patent No.: US 12,635,616 B1
(45) Date of Patent: May 26, 2026

(54) INDOOR HORTICULTURE SYSTEM

(71) Applicant: BroScience LLC, Billings, MT (US)

(72) Inventor: Trenton Hancock, Billings, MT (US)

( * ) Notice: Subject to any disclaimer, the term of this patent is extended or adjusted under 35 U.S.C. 154(b) by 0 days.

(21) Appl. No.: 19/215,820

(22) Filed: May 22, 2025

(51) Int. Cl.
*A01G 9/24* (2006.01)
*A01G 9/14* (2006.01)

(52) U.S. Cl.
CPC ............. *A01G 9/246* (2013.01); *A01G 9/249* (2019.05); *A01G 9/14* (2013.01)

(58) Field of Classification Search
CPC ...................................................... A01G 9/246
See application file for complete search history.

(56) References Cited

U.S. PATENT DOCUMENTS

| | | | | |
|---|---|---|---|---|
| 2,904,254 A | * | 9/1959 | Bahnson, Jr. | F24F 11/77 236/44 C |
| 3,474,720 A | * | 10/1969 | Sartain | A01G 9/246 454/236 |
| 3,949,522 A | * | 4/1976 | Kehl | A01G 9/246 47/17 |
| 4,196,544 A | * | 4/1980 | Davis | A01G 7/045 165/47 |
| 5,493,808 A | * | 2/1996 | Munday | A01G 9/246 47/60 |
| 2014/0260131 A1 | | 9/2014 | Burkhauser | |
| 2018/0125016 A1 | * | 5/2018 | Dufresne | A01G 9/1423 |
| 2018/0220595 A1 | | 8/2018 | Hancock | |
| 2018/0288954 A1 | | 10/2018 | Glaser et al. | |
| 2018/0359943 A1 | * | 12/2018 | Vukas | A01G 9/246 |
| 2019/0313588 A1 | * | 10/2019 | Zimmerman | A01G 9/1423 |
| 2021/0212269 A1 | * | 7/2021 | Park | F24F 5/0003 |
| 2021/0360872 A1 | * | 11/2021 | Tai | A01G 9/246 |
| 2022/0240458 A1 | * | 8/2022 | Breza | A01G 9/249 |
| 2022/0322616 A1 | * | 10/2022 | Romine | A01G 9/023 |

FOREIGN PATENT DOCUMENTS

| | | |
|---|---|---|
| CN | 201332616 Y | 10/2009 |
| CN | 114071990 A | 2/2022 |
| EP | 0004450 A2 | 10/1979 |
| KR | 101479191 B1 | 1/2015 |
| KR | 20160115042 A | 10/2016 |
| KR | 20240098435 A | 6/2024 |

OTHER PUBLICATIONS

Translation of KR_2016057603_A (Year: 2016).*

* cited by examiner

*Primary Examiner* — Timothy D Collins
*Assistant Examiner* — Brittany A Lowery
(74) *Attorney, Agent, or Firm* — Antoinette M. Tease

(57) ABSTRACT

An indoor horticulture system with modular units arranged in rows within a grow room separated from an air control room by a divider wall. Each row of modular units has air intake and air outlet ducting. The air intake ducting is configured to transmit air from the air control room to the modular units via an air supply fan within each modular unit. The air exhaust ducting is configured to transmit air from the modular units via an air exhaust fan within each modular unit through the air control room and to exhaust air outside of the building. Each modular unit and the air control room has an air temperature sensor. Power dampers in the air control room are controlled by input from the air control room sensor. The speed of the air supply and exhaust fans are controlled by input from the sensors in the modular units.

4 Claims, 9 Drawing Sheets

8

8

8

24

24

24

INDOOR HORTICULTURE SYSTEM

BACKGROUND OF THE INVENTION

1. Field of the Invention

The present invention relates generally to the field of indoor horticulture, and more specifically, to an indoor horticulture system that regulates the temperature of the grow room based on recycling ambient air.

2. Description of the Related Art

The present invention solves two problems associated with indoor horticulture. It reduces energy consumption while creating an environment that is less hospitable to pests and mold. Indoor horticulture equipment currently uses a lot of power. Electricity costs associated with indoor horticulture are substantial, in part because of the energy required to combat the heat and humidity of a sealed room. Furthermore, current horticulture technology has not resolved how to prevent bugs and mold without the use of pesticides and fungicides. Pesticides and fungicides are a significant problem in greenhouse food production. The present invention solves both of these problems by providing a system that utilizes the highest volume of fresh air possible while controlling the temperature of the grow room through the use of algorithms that simulate an ideal day. The present invention is both modular and scalable.

U.S. Patent Application Pub. No. 2018/0220595 (Hancock) discloses a vertical plant growing system comprised of a vertical plant stand with a central lighting array. The plant stand is connected to a heating, ventilation, and air conditioning (HVAC) system, which is operable in a plurality of airflow modes calibrated to inhibit insect growth and to kill mold. The vertical plant tower is comprised of an outer plant stand surrounding a central lighting column. The invention includes a plurality of environmental sensors disposed in the HVAC system and in the vertical tower. A controller is configured to monitor the plurality of environmental sensors and to control one or more airflow devices. In a first mode, the central lighting column is energized, and air is circulated by the HVAC system through the vertical plant tower at approximately 65° to 74° F. to simulate daytime conditions. In a second mode, the central lighting column is deenergized, and air is circulated through the vertical plant tower by the HVAC system at approximately 45° F. to simulate nighttime conditions. In a third mode, the central lighting column is energized, and air is circulated through the vertical plant tower by the HVAC system at approximately 92° F. or above. The system automatically transitions between the first, second, and third modes based on the duration of each mode and feedback from the environmental sensors.

U.S. Patent Application Pub. No, 2018/0288954 (Glaser et al.) provides a method of growing plants comprised of emitting light from a light source onto the plant foliage, positioning the light source within a conduit that has an inlet and an outlet, transmitting the emitted light across a transparent wall of the light conduit to the plants, circulating air in the light source conduit, thereby allowing the circulating air to absorb heat from the light source, and transferring at least some of the heated air obtained from the outlet of the conduit to the growing chamber. In a preferred embodiment, the method includes transferring at least some of the heated air to an air reserve and transferring air from the air reserve to the growing chamber. The method also contemplates using temperature sensors in the air reserve and in the growing room to control the quantity of heated air being transferred to the air reserve or the growing room to reach a target temperature.

U.S. Patent Application Pub. No. 2014/0260131 (Burkhauser) discusses a grow light cooling and grown room odor pollution control system that incorporates an air plenum with a plurality of air inlets; a plurality of air ducts connecting each air inlet to at least one grow light housing; at least one air outlet; an air pump mounted in the air plenum; and at least one filter that is coupled to the air pump. The air pump pulls hot and odorous air from grow light housings into the air plenum, through the air filter, and then out from the plenum for dissipation in the outside atmosphere or for use in heating a structure. The air plenum is preferably comprised of a metal frame covered by a fabric housing cover.

BRIEF SUMMARY OF THE INVENTION

The present invention is an indoor horticulture system comprising: a plurality of modular units situated within a grow room; and an air control room that is separated from the grow room by a divider wall; wherein the modular units are arranged in one or more rows, each row of modular units having air intake ducting and air outlet ducting; wherein the air intake ducting extends from a proximal end of each row of modular units to the air control room and is configured to transmit air from the air control room to the plurality of modular units in a given row via an air supply fan that is situated at a top of each modular unit, the air supply fan being configured to deliver air into a frame of each modular unit, the frame being comprised of hollow tubing, and out through holes in a bottom part of the frame of each modular unit; wherein the air exhaust ducting extends from a proximal end of each row of modular units through the air control room to an outer wall of a building in which the grow room and the air control room are situated, the air exhaust ducting being configured to transmit air from the modular units in a given row via an air exhaust fan that is situated at a top of each modular unit adjacent to the air supply fan and to exhaust air outside of the building: wherein each modular unit comprises an air temperature sensor that senses air temperature in the modular unit; wherein the air control room comprises a sensor that senses air temperature in the air control room; wherein each modular unit comprises a plurality of lights that are configured to emit light onto plants that are situated within the modular unit, wherein the air outlet ducting that passes through the air control room comprises a first powered damper that is configured to open or close based on input from the air temperature sensor within the air control room; wherein when the first powered damper on the air outlet ducting is in an open position, air that would otherwise be exhausted to the outside of the building is diverted back into the air control room; and wherein the air control room comprises a second powered damper that is situated on an exterior wall of the air control room and configured to let air into the air control room from outside of the building when the second powered damper is in an open position, the position of the second powered damper being controlled by input from the air temperature sensor within the air control room.

In a preferred embodiment, the air control room further comprises a heating, ventilation, and air conditioning (HVAC) unit for each row of modular units, each HVAC unit being configured to provide warm or cool air to the air control room. In another preferred embodiment, the frame of each modular unit is comprised of two pairs of vertical members, each pair of vertical members being joined by a bottom rung, the bottom rung being comprised of a plurality of holes configured to emit air being supplied to the frame from the air supply fan; wherein the frame of each modular unit further comprises first and second diagonal members that extend diagonally across a top of the modular unit to form an offset "X" shape; wherein the air supply fan is situated at a center of the "X" in the offset "X" shape at the top of the modular unit; and wherein the air exhaust fan is situated adjacent to the air supply fan at a center of the top of the modular unit.

The air supply fan and the air exhaust fan in a given modular unit preferably operate at the same speed at all times; and the speed of the air supply fan and the air exhaust fan in a given modular unit is preferably controlled by a processor based on input from the air temperature sensor in the given modular unit.

REFERENCE NUMBERS

Figure 1:
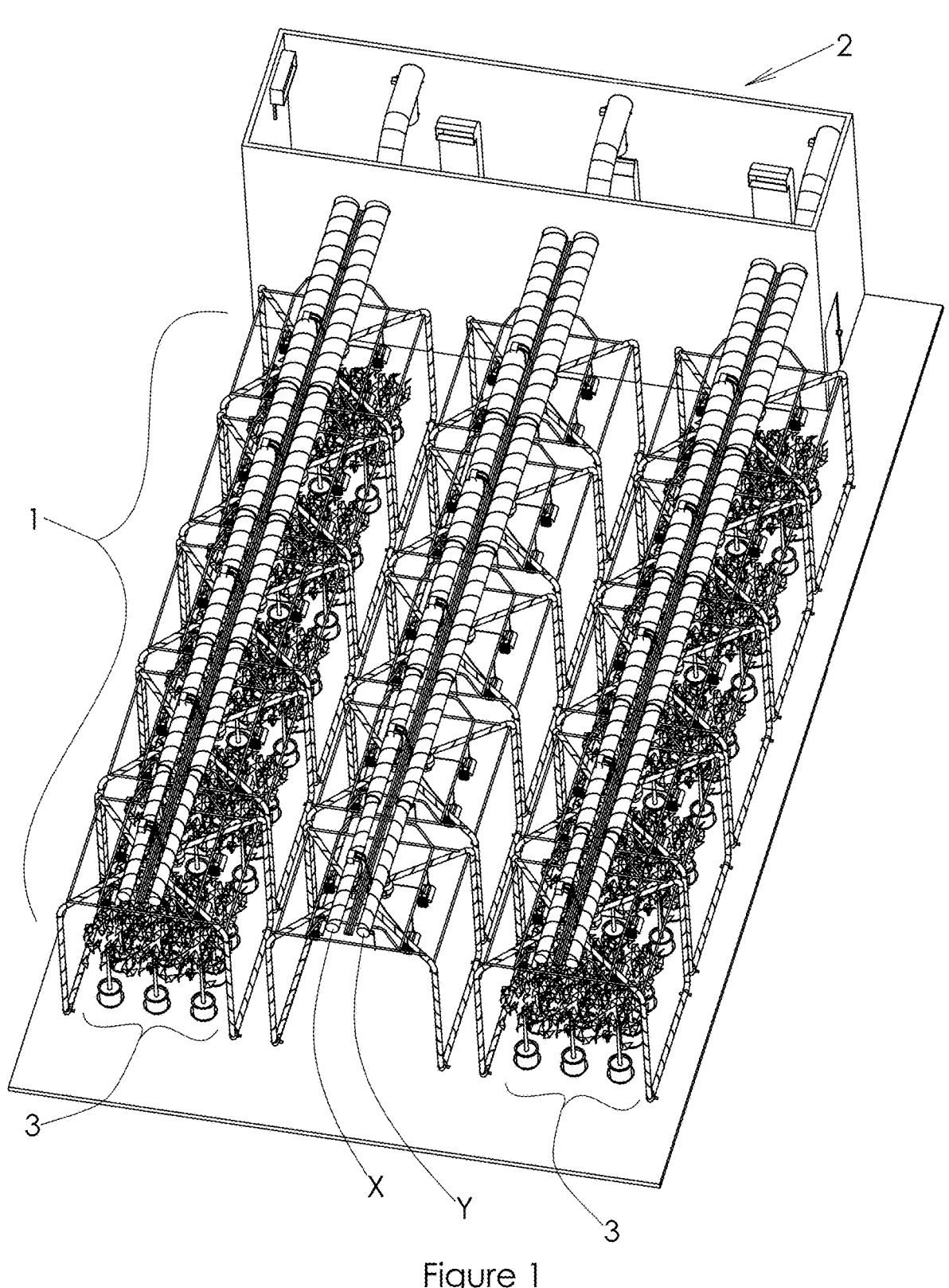
FIG. 1 is a top perspective view of the present invention shown in a configuration of three rows of modular units.

1 Grow room
2 Air control room
3 Plants
4 Modular unit
5 Main frame
5a Vertical member
5b First diagonal member
5c Second diagonal member
6a Air supply fan
6b Air exhaust fan
7 Air intake ducting
8 Air outlet ducting
9 Light
10 Bottom rung (of main frame)
11 Holes (in bottom rung of main frame)
12 Modular unit air temperature sensor
13 Control box
14 Divider wall
15 Outer wall
16 HVAC unit (indoor unit)
17 Main damper
18 Side wall
19 Exhaust portal 20 Air control room air temperature sensor
21 Tubular extension
22 Diversion flap
23 Electrical conduit
24 HVAC unit (outdoor unit)
25 Air vent
26 Secondary frame

DETAILED DESCRIPTION OF INVENTION

FIG. 1 is a top perspective view of the present invention shown in a configuration of three rows of modular units. As shown in this figure, the present invention is a system comprised of a plurality of modular units that share common ductwork, which connects each modular unit to the air control room. The modular units are located in the grow room 1, which is adjacent to the air control room 2. A plurality of plants are situated within each modular unit. In this figure, the plants have been omitted from the middle row for clarity.

Figure 2:
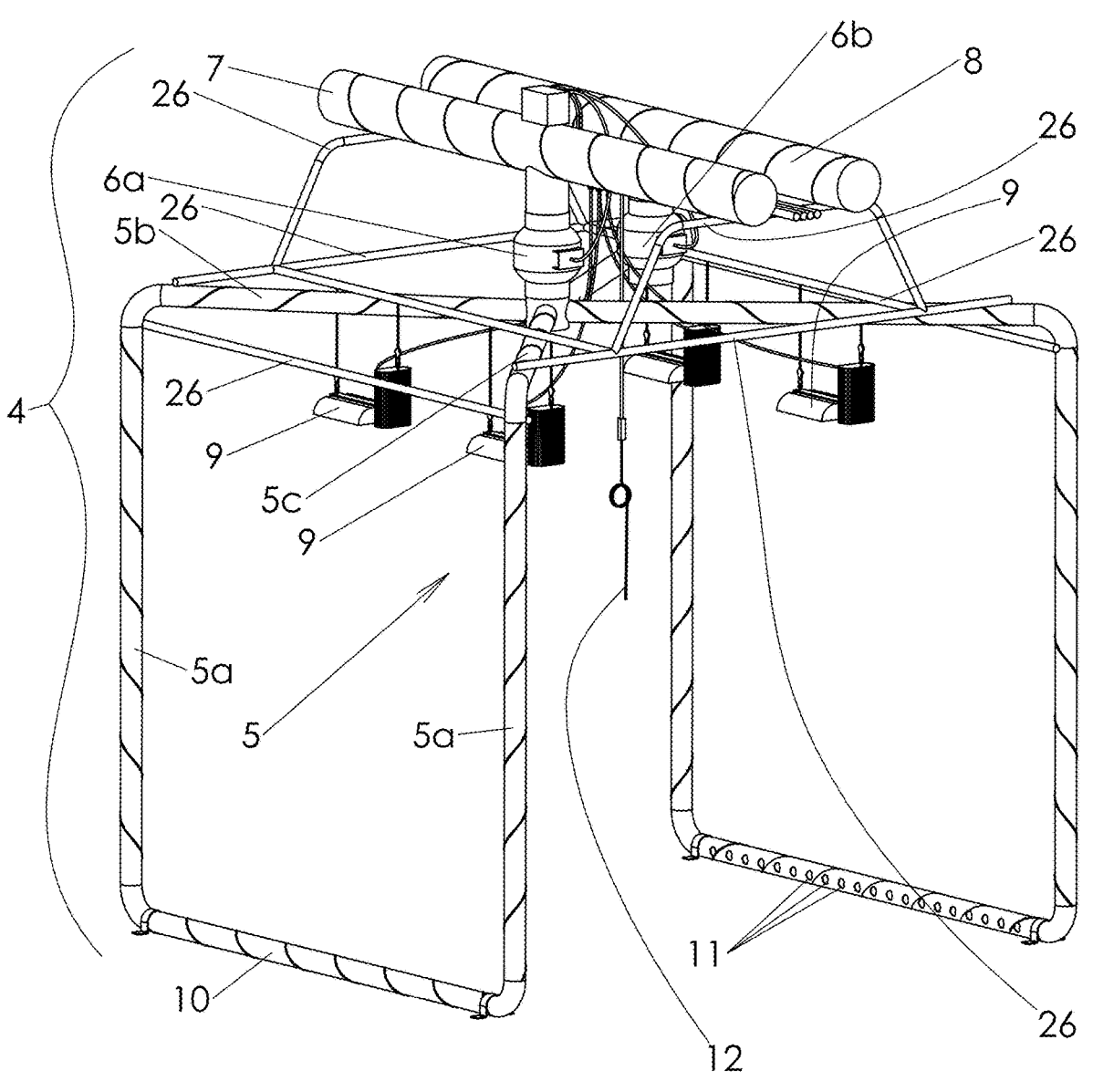
FIG. 2 is a perspective view of a single modular unit of the present invention.

FIG. 2 is a perspective view of a single modular unit of the present invention. As shown in this figure, each modular unit 4 is comprised of a main frame 5, two fans 6a, 6b situated on top of the main frame, air intake ducting 7 on top of the air supply fan 6a, and air outlet ducting 8 on top of the air exhaust fan 6b. The air supply fan 6a is in fluid communication with the air intake ducting 7, and the air exhaust fan 6b is in fluid communication with the air exhaust fan 6b. When the invention is configured in multiple modular units, as shown in FIG. 1, more than one air supply fan 6a is connected to the air intake ducting 7, and more than one air exhaust fan 6b is connected to the air outlet ducting 8. The air intake ducting 7 is configured to supply air from the air control room 2 to the modular units 4, and the air outlet ducting is configured to remove warm air created by the heat from the lights 9 from the modular units 4 and into the air control room 2 or to the outdoors, depending on the position of the diversion flap 22 (see discussion of FIGS. 7 and 8 below). Note that the "diversion flap" is a powered damper; to differentiate this powered damper from the main damper 17, this powered damper is referred to herein as the "diversion flap."

As discussed more fully below, the air temperature in the air control room 2 determines whether the system exhausts the heat (to the outside of the building), brings in new air (through the main damper 17), or recycles the heat (by delivering the warmed air into the air outlet ducting 8 via the air exhaust fan 6b, depositing it into the air control room via the diversion flap 22, and sending it back out to the modular units via the air intake ducting 7) to raise air supply temperatures in the grow room.

The main frame 5 is preferably comprised of two bottom rungs 10, each of which has a plurality of holes 11 that face inward (toward the center of the modular unit) and are configured to emit warm or cool air that travels from the air supply fan 6a into the main frame 5 and out of the holes 11. The main frame 5 is comprised of hollow tubing that forms a rectangle shape with an open top (in other words, two parallel vertical members connected by a bottom rung) on either side of the modular unit 4 and an offset "X" on top of the modular unit. In other words, the main frame 5 is comprised of two parallel vertical members Sa connected by a bottom rung 10 on either side of the main frame 5, forming first and second sides of the main frame. The first and second sides of the main frame are parallel to each other.

Figure 3:
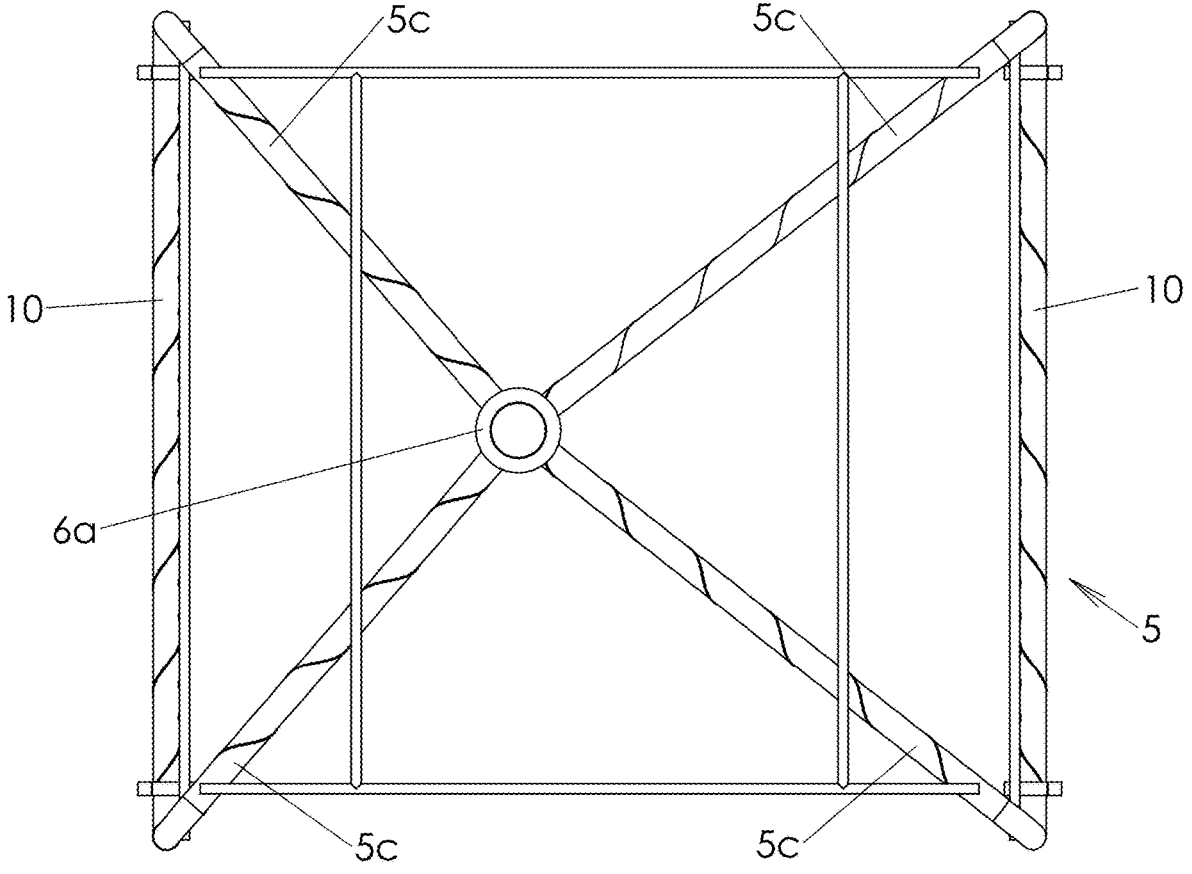
FIG. 3 is a top view of the main frame with the ducting removed for clarity.

A first diagonal member 5b runs from the top of the vertical member Sa on the left-hand side of the first side (in the foreground on the left side of FIG. 2) of the main frame 5 to the top of the vertical member Sa on the left-hand side of the second side (in the background on the right side of FIG. 2) of the main frame 5. A second diagonal member 5c runs from the top of the vertical member Sa on the right-hand side of the first side (in the foreground on the left side of FIG. 2) of the main frame 5 to the top of the vertical member on the right-hand side of the second side (in the background on the right side of FIG. 2) of the main frame 5. In this paragraph, the terms "right" and "left" are used with reference to a person standing outside of the modular unit and facing the first or second side of the main frame 5. Thus, the vertical members Sa on the right-hand side of the first and second sides of the main frame are actually in the center of FIG. 2, and the vertical members Sa on the left-hand side of the first and second sides of the main frame are on the outside of FIG. 2. Note that the first and second diagonal members 5b, 5c form an "X" on top of the main frame 5 (see FIG. 3). Note also that the center of the "X" is preferably offset; this is to accommodate the air exhaust fan 6b (not shown in FIG. 3) so that it can be situated alongside the air supply fan 6a in the center of the modular unit 4.

In a preferred embodiment, the air supply fan 6a is situated at the top of the main frame 5, at the center of the "X" formed by the first and second diagonal member 5b, 5c. Note that the "X" is offset from the center of the frame. The air exhaust fan 6b is preferably situated adjacent to the air supply fan 6a. In a preferred embodiment, the air exhaust fan 6b is situated in the center of the frame, adjacent to the center of the "X" (in FIG. 3, the air exhaust fan 6b, which is not shown, would be just to the right of the air supply fan 6a), so as to be best positioned to uptake air from the entirety of the modular unit. The air intake ducting 7 and the air exhaust ducting 8 are preferably parallel to each other and situated directly over the air supply fan 6a and the air exhaust fan 6b, respectively. A plurality of lights 9 are preferably suspended from a secondary frame 26 that sits on top of the main frame 5 and configured to shine light on the plants 3 (not shown in this figure) beneath them. In a preferred embodiment, the lights 9 are high-intensity discharge (HID) or high-pressure sodium (HPS) lights. In this embodiment, the secondary frame 26 comprises four rails that rest on top of the diagonal members 5b, 5c and from which the lights are hung and two inverted U-shaped brackets upon which the ducting 7, 8 and electrical conduits 23 rest.

Figure 4:
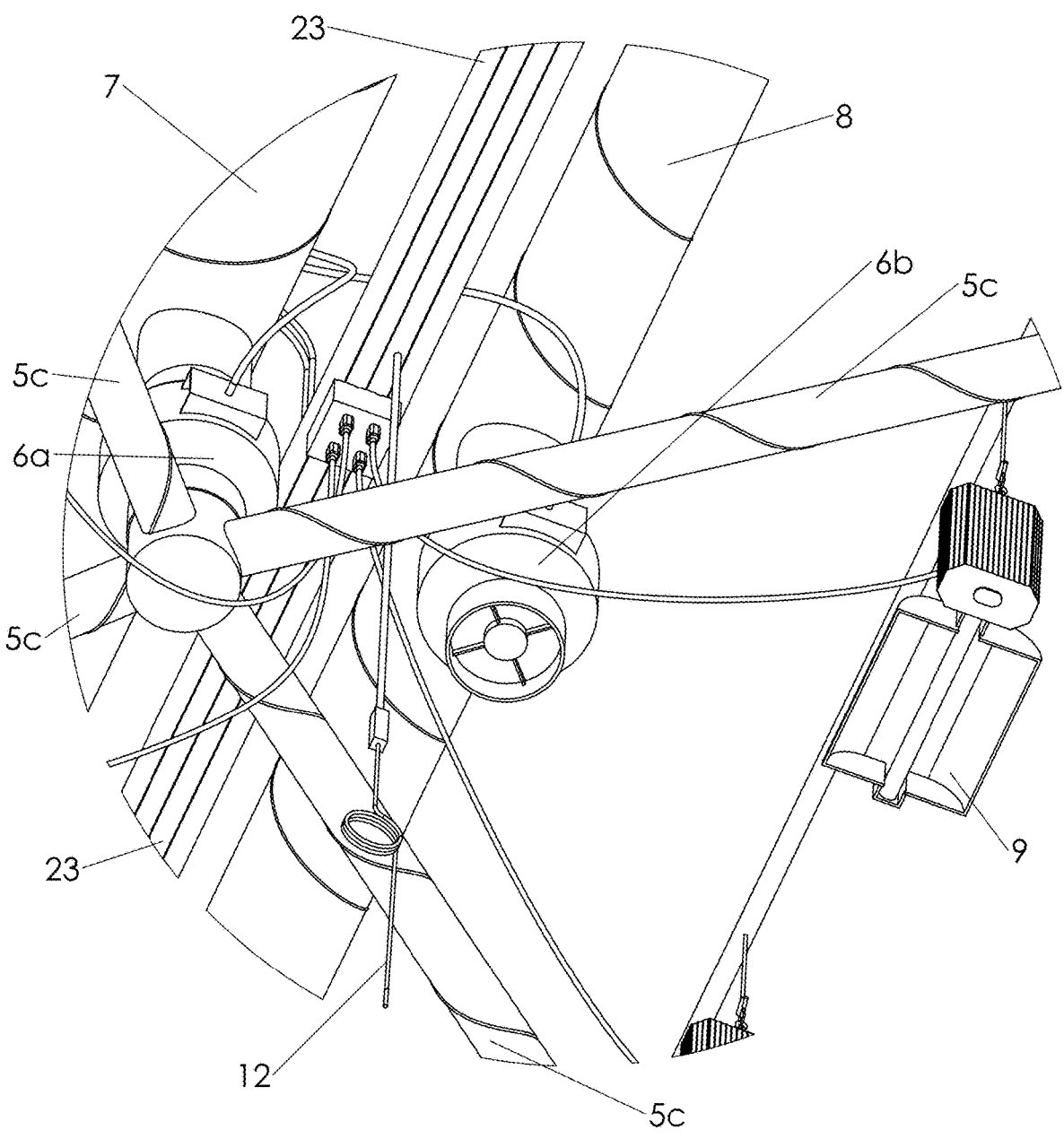
FIG. 4 is a bottom perspective view of the top of the main frame showing the air supply and air exhaust fans.
Figure 5:
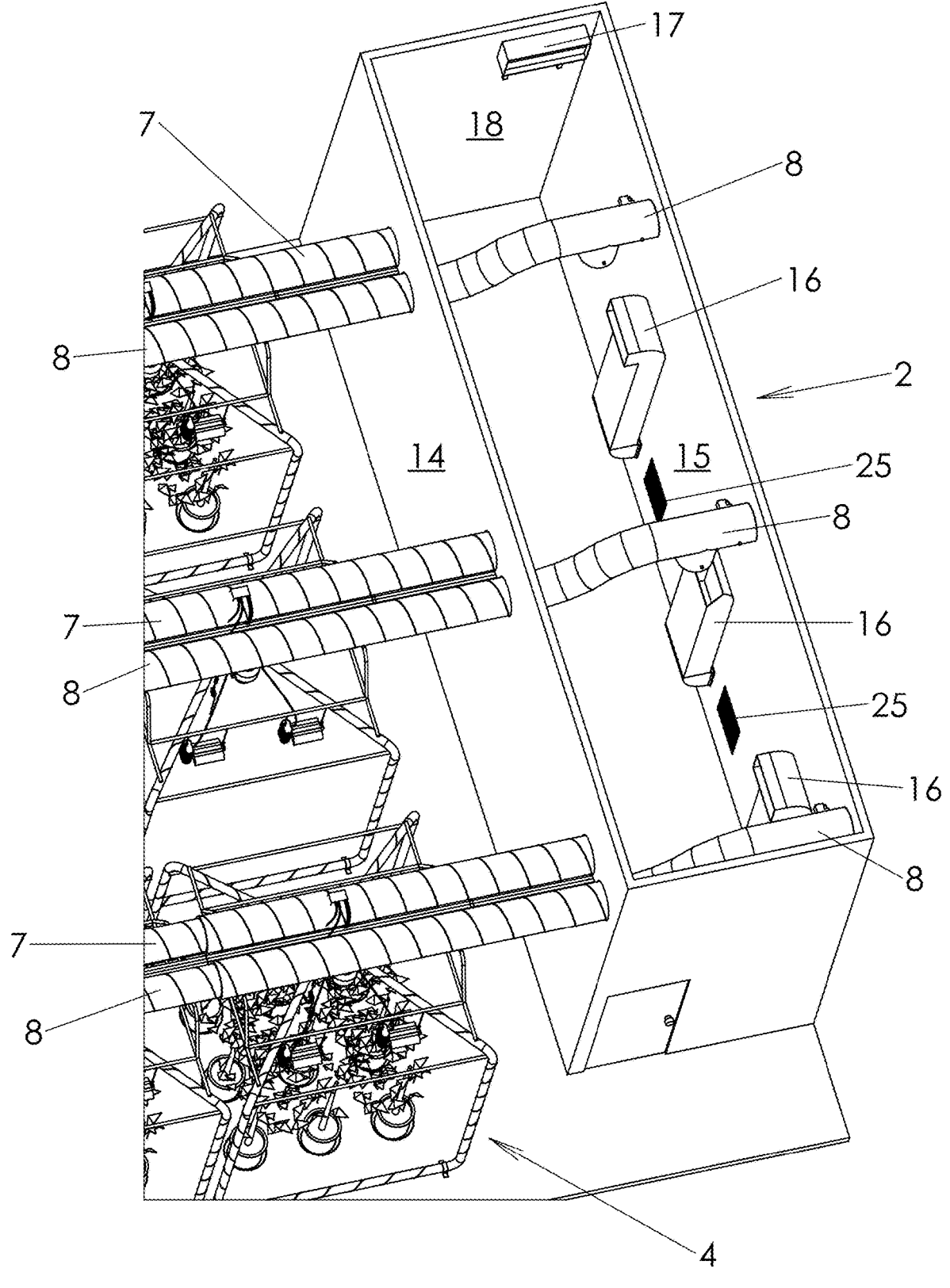
FIG. 5 is an overhead view of the air control room and the rear end of the grow room.
Figure 9:
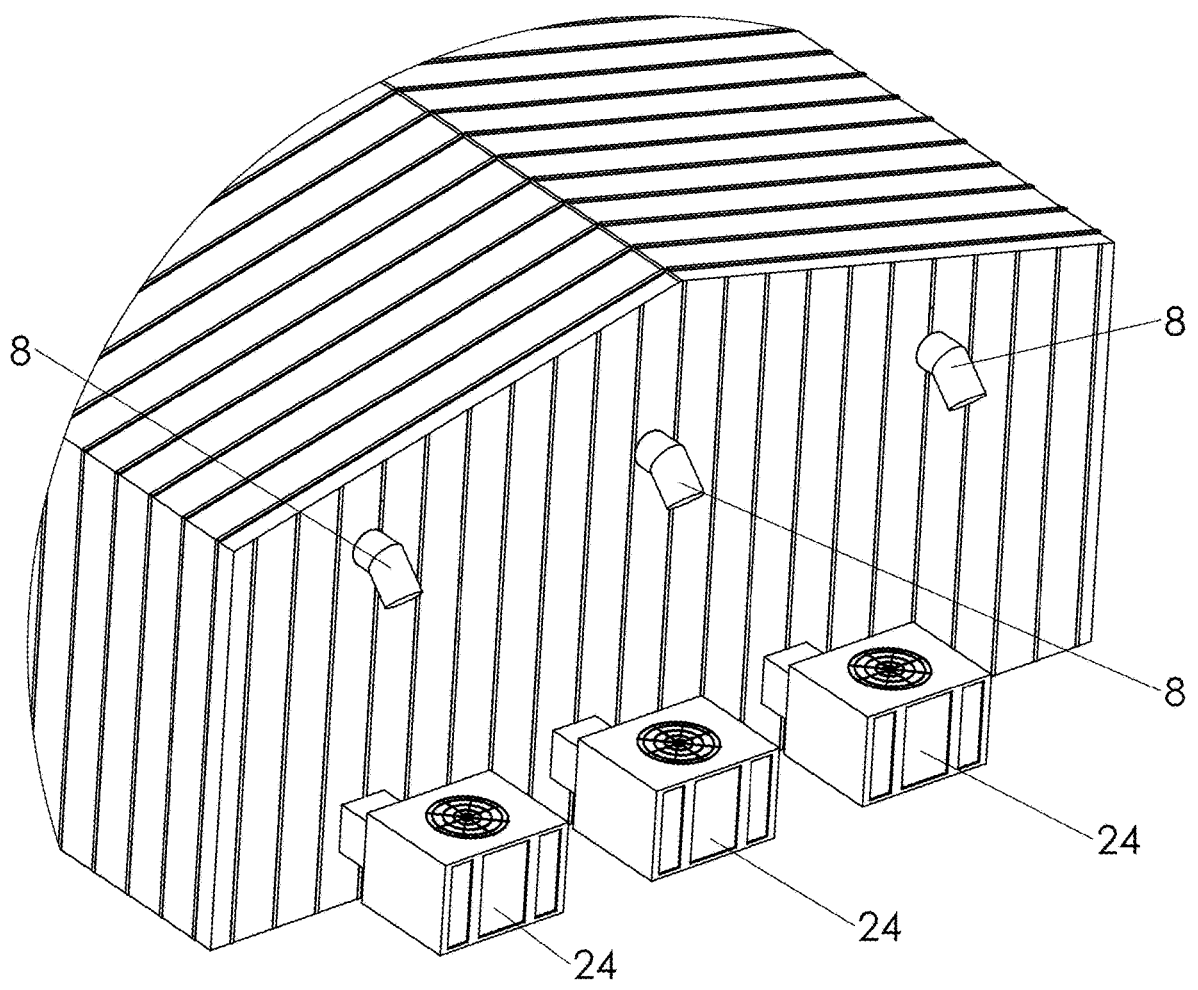
FIG. 9 is a perspective view of the outside of the building showing the HVAC units and air outlet ducting.

FIG. 4 is a bottom perspective view of the top of the main frame showing the air supply and air exhaust fans. As shown in this figure, the air supply fan 6a has a closed bottom end because it is delivering air from the air control room into the main frame 5 of the modular unit 4. The air exhaust fan 6b has an open bottom end because it intakes air from the grow room and transmits it, via the air outlet ducting 8, to the outside of the building. A modular unit air temperature sensor 12 is suspended from a point in between the two fans 6a, 6b and extends downwardly to a point below the lights 9. This sensor 12 measures the temperature of the ambient air within the modular unit 4. The sensor 12 is in communication with a processor within the control box 13 (see FIG. 6) in the air control room. The processor is configured to control the speed of the air supply and exhaust fans 6a, 6b based on air temperature readings from the sensor 12. In a preferred embodiment, the air supply and exhaust fans 6a, 6b in a given modular unit 4 always operate at the same speed so that air is supplied to and removed from the modular unit 4 at the same rate. The fans in one modular unit, however, may be operating at a different speed than the fans in another modular unit in the same row. In other words, the fans in one modular unit can be individually controlled based on the air temperature of that particular modular unit 4. The sensor 12 preferably hangs from a series of electrical conduits 23 between air supply and air outlet ducting 7, 8. Each modular unit 4 has its own sensor 12, FIG. 5 is a first overhead view of the air control room and the rear end of the grow room. As shown in this figure, the air control room 2 is preferably situated at the rear end of the grow room 1. The air intake ducting 7 runs from a divider wall 14 between the grow room 1 and the air control room 2 to the proximal end (that is, the end furthest from the air control room) of the air intake ducting 7 at the front end of the forward-most modular unit 4 (see "X" on FIG. 1). The air outlet ducting 8 runs from an outer wall 15 of the air control room 2 (see also FIG. 9) to the proximal end of the air outlet ducting 8 at the front end of the forward-most modular unit 4 (see "Y" on FIG. 1). Air vents 25 in the air control room allow air to be sucked into the HVAC units 24 (see FIG. 9), where the air can be cooled or warmed as needed, and transmitted back into the air control room 2 via the HVAC units 16. Ideally, the temperature in the air control room 2 matches the temperature of the air in the air intake ducting 7. The air intake ducting 7 is always pulling air from the air control room 2, whether it is fresh air that enters the air control room from outside of the building (via the main damper 17) or recycled air that is deposited into the air control room from the air exhaust ducting 8 via the diversion flap 22.

When the invention is in operation, the HVAC units would be used only if needed to warm or cool the air in the air control room at certain times of the day or night. Otherwise, during normal operation, the HVAC units are not in use. For example, in the winter, the HVAC units might be used to warm the air in the control room before the lights 9 are turned on, assuming the system is programmed to go from a cooler night cycle (to prevent bugs) to a warmer day cycle. This helps the modular units 4 warm up more quickly than by simply using ambient air from outside of the building. The HVAC might also be used to cool the air in the air control room when the lights are off to drop the temperature, thereby simulating nighttime. In the summer, the system could be used to pull in cool air at night with no air conditioning and the lights on; the air conditioning would be turned on when the lights are off during the day. (This allows companies to run more lights on the same amount of power supplied to the building, which is an important aspect of controlling power draw.) When the system is in an "internal cycle mode, the lights are shut off, and the system is not bringing in new air from outside of the building. It should be clear from this description that the present invention may be used in any number of modes to optimize plant growth and minimize power usage through the selective use of lights and the circulation (or recirculation) of air with or without the HVAC system.

The air control room 2 preferably contains a heating, ventilation and air conditioning (HVAC) unit 16 associated with each row of modular units 4. In the embodiment shown in FIG. 5, there are three HVAC units 16 in the air control room 2. Each HVAC unit 16 is configured to be turned on or off, and to provide warm or cool air to the air control room 2, based on input from an air temperature sensor 20 in the air control room (see FIG. 6). As noted above, the air temperature sensors 12 in the center of each modular unit 4 control the operation of the air supply and exhaust fans 6a, 6b of that particular modular unit. Thus, the delivery of air to and from each modular unit, and the temperature of each modular unit, is individually controlled.

The air control room 2 also comprises a main damper 17 that is situated on a side wall 18 of the air control room 2. The main damper 17 is configured to open when there is negative air pressure in the air control room (caused by the system exhausting air to the outside of the building) and to close when there is normal air pressure in the air control room. There would be negative air pressure in the air control room when the air intake tubing 7 is pulling air from the air control room 2 and into the main frame 5 of the modular units 4 (and out of the holes 11 on the bottom rung 10). Thus, as air is pulled out of the air control room 2 and into the modular units 4, ambient air is drawn into the air control room 2 through the main damper 17.

Figure 6:
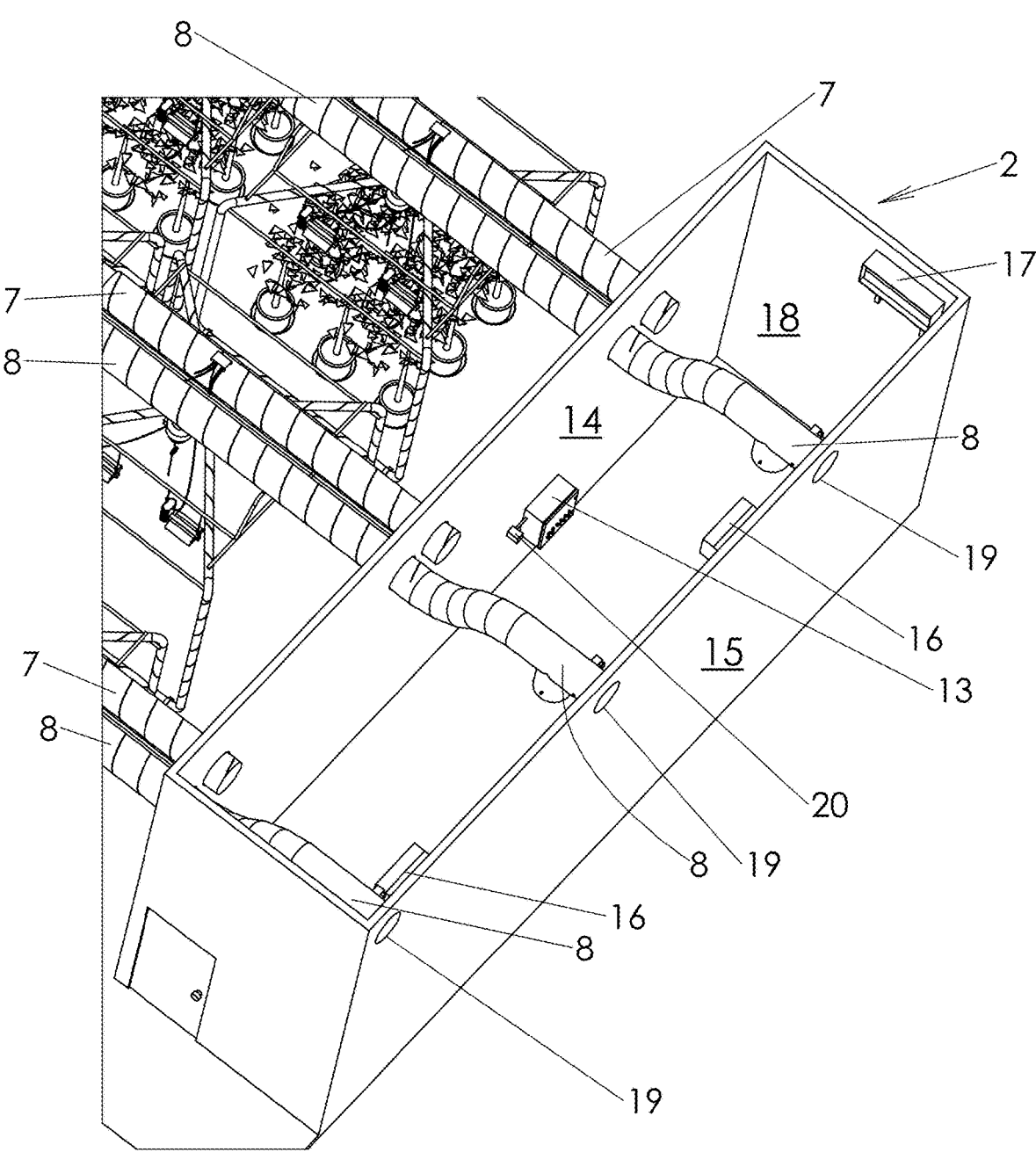
FIG. 6 is a second overhead view of the air control room and the rear end of the grow room.

FIG. 6 is a second overhead view of the air control room and the rear end of the grow room. As shown in this figure, the control box 13 is preferably mounted on the divider wall 14 inside of the air control room 2. An air room temperature sensor 20 is preferably situated adjacent to the control box 13. The control box 13 contains the processor, which is in electronic communication with the sensors 12, 20 and is configured to control the operation of the air intake and exhaust fans 6a, 6b and the HVAC units 16 in the air control room 2. This figure also shows the distal end (that is, the end that terminates at the air control room) of the air intake ducting 7 and the exhaust portals 19 through which the air taken up by the exhaust fan 6b is emitted to the outside of the building. Thus, ambient air is circulated throughout the system via the main damper, air control room, air intake ducting, holes in the bottom rungs of the frames of the modular units, exhaust fans, and air outlet ducting to the outside atmosphere. While in the air control room, the air is heated or cooled based on input from the sensor in the air control room and pre-programmed algorithms that set the desired temperature of the modular units 4 at certain times of the day and night.

Figure 7:
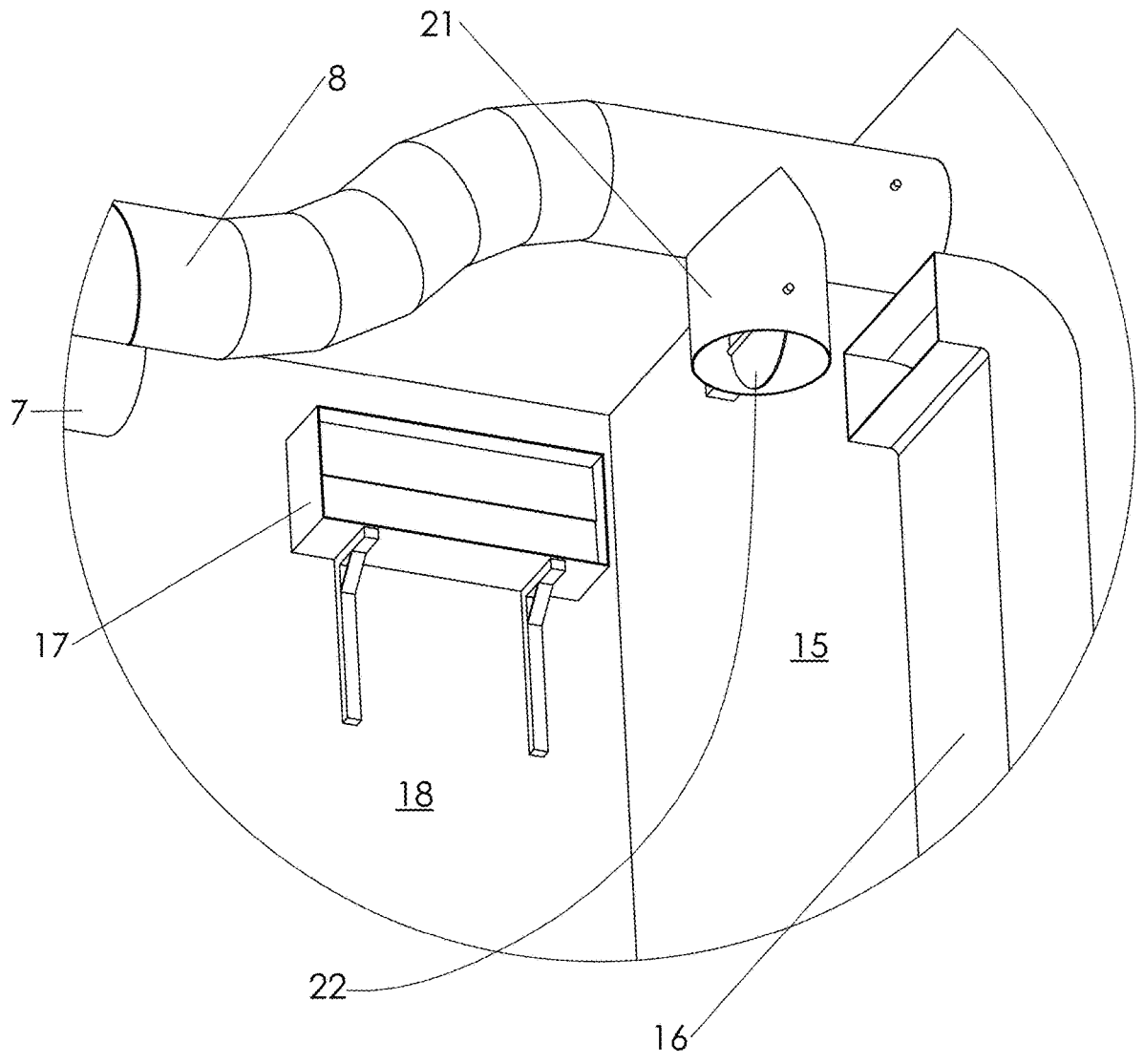
FIG. 7 is a detail view of the diversion flap on the air outlet ducting in the air control room shown with the diversion flap in an open position.
Figure 8:
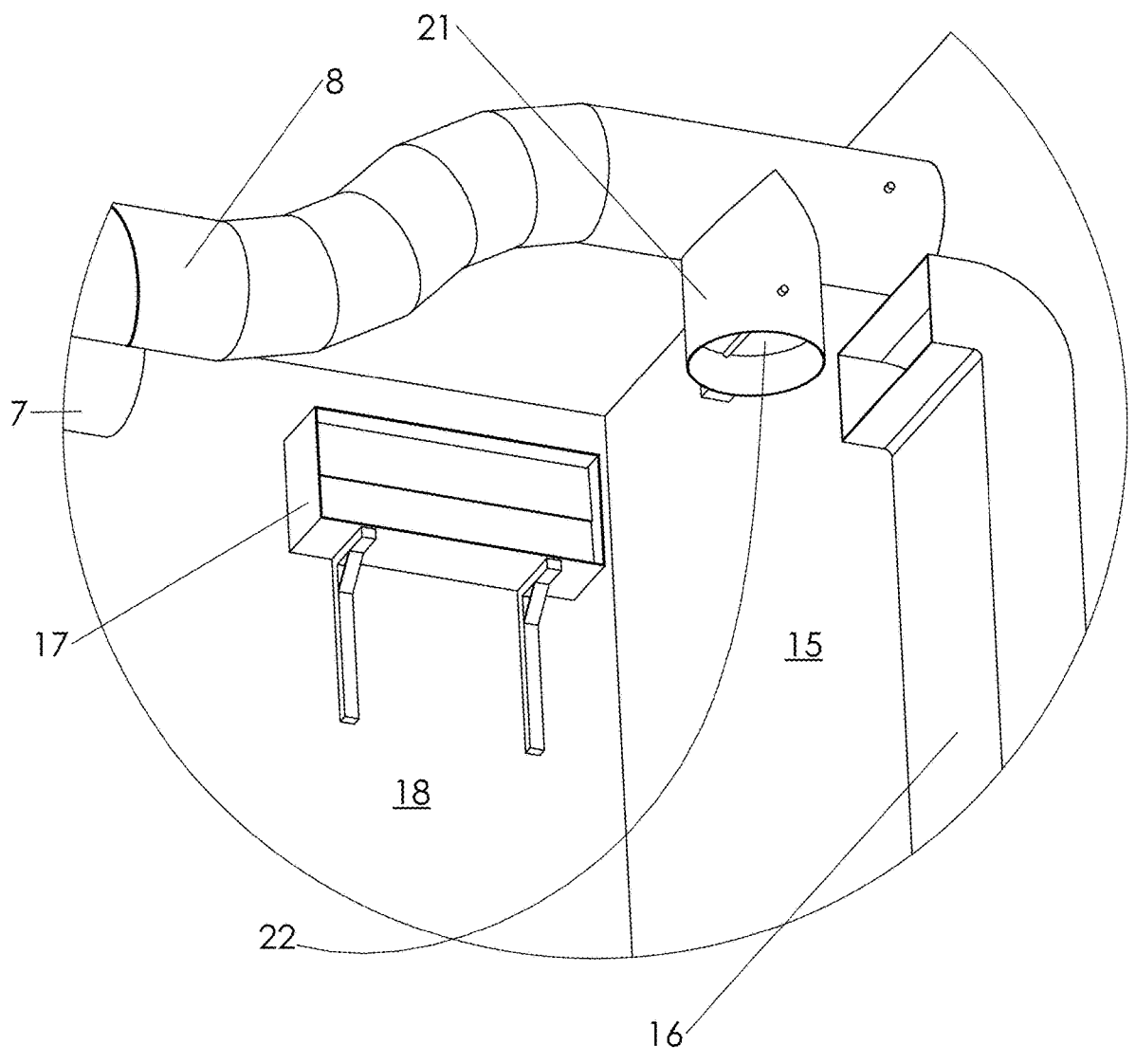
FIG. 8 is a detail view of the diversion flap on the air outlet ducting in the air control room shown with the diversion flap in a closed position.

FIG. 7 is a detail view of the diversion flap on the air outlet ducting in the air control room shown with the diversion flap in an open position, and FIG. 8 is a detail view of the diversion flap on the air outlet ducting in the air control room shown with the diversion flap in a closed position. As shown in these figures, the air outlet tubing 8 preferably comprises a tubular extension 21 that extends downwardly from the distal end of the air outlet tubing 8 just inside of the outer wall 15. The tubular extension 21 contains a diversion flap 22 that is configured to rotate between an open position and a closed position When in an open position, the diversion flap 22 allows warm air taken up by the exhaust fans 6b in the modular units 4 to be diverted to the air control room when an increase in the air temperature in the air control room 2 is desired. Similarly, the diversion flap 22 is configured to close when warm air from the modular units 4 is not needed to warm the air in the air control room 2. The opening and closing of the diversion flap is also controlled by the processor in the control box. 16.

Because hot air rises, the present invention creates a circular air flow throughout the system in which warmer air from the lights 9 rises to the top of the modular unit 4, where it is taken up by the air exhaust fan 6b and deposited to the outdoors or recycled into the air control room, where it is cooled to the desired temperature, taken up by the air intake ducting 7, and transmitted into the modular units via the holes 11 on the bottom rung 10 of the main frame 5. In this manner, warm air is removed from the modular unit at the top of the unit, and cooler air is returned to the bottom of the modular unit, where it is warmed by the lights and taken up by the air exhaust fans, etc.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. An indoor horticulture system comprising:
(a) a plurality of modular units situated within a grow room; and
(b) an air control room that is separated from the grow room by a divider wall;
wherein the modular units are arranged in one or more rows, each row of modular units having air intake ducting and air outlet ducting;
wherein the air intake ducting extends from a proximal end of each row of modular units to the air control room and is configured to transmit air from the air control room to the plurality of modular units in a given row via an air supply fan that is situated at a top of each modular unit, the air supply fan being configured to deliver air into a frame of each modular unit, the frame being comprised of hollow tubing, and out through holes in a bottom part of the frame of each modular unit,
wherein the air exhaust ducting extends from a proximal end of each row of modular units through the air control room to an outer wall of a building in which the grow room and the air control room are situated, the air exhaust ducting being configured to transmit air from the modular units in a given row via an air exhaust fan that is situated at a top of each modular unit adjacent to the air supply fan and to exhaust air outside of the building;
wherein each modular unit comprises an air temperature sensor that senses air temperature in the modular unit;
wherein the air control room comprises a sensor that senses air temperature in the air control room;
wherein each modular unit comprises a plurality of lights that are configured to emit light onto plants that are situated within the modular unit;
wherein the air outlet ducting that passes through the air control room comprises a first powered damper that is configured to open or close based on input from the air temperature sensor within the air control room;
wherein when the first powered damper on the air outlet ducting is in an open position, air that would otherwise be exhausted to the outside of the building is diverted back into the air control room; and
wherein the air control room comprises a second powered damper that is situated on an exterior wall of the air control room and configured to let air into the air control room from outside of the building when the second powered damper is in an open position, the position of the second powered damper being controlled by input from the air temperature sensor within the air control room.

2. The indoor horticulture system of claim 1, wherein the air control room further comprises a heating, ventilation, and air conditioning (HVAC) unit for each row of modular units, each HVAC unit being configured to provide warm or cool air to the air control room.

3. The indoor horticulture system of claim 1, wherein the frame of each modular unit is comprised of two pairs of vertical members, each pair of vertical members being joined by a bottom rung, the bottom rung being comprised of a plurality of holes configured to emit air being supplied to the frame from the air supply fan;

wherein the frame of each modular unit further comprises first and second diagonal members that extend diagonally across a top of the modular unit to form an offset "X" shape;

wherein the air supply fan is situated at a center of the "X" in the offset "X" shape at the top of the modular unit; and wherein the air exhaust fan is situated adjacent to the air supply fan at a center of the top of the modular unit.

4. The indoor horticulture system of claim 1, wherein the air supply fan and the air exhaust fan in a given modular unit operate at the same speed at all times; and wherein the speed of the air supply fan and the air exhaust fan in a given modular unit is controlled by a processor based on input from the air temperature sensor in the given modular unit.

\* \* \* \* \*